United States Patent
Miescher (10) Patent No.: US 8,328,012 B2
(45) Date of Patent: Dec. 11, 2012

(54) FASTENING ELEMENT MAGAZINE STRIP

(75) Inventor: Stefan Miescher, Schaan (LI)

(73) Assignee: Hilti Aktiengesellschaft, Schaan (LI)

(*) Notice: Subject to any disclaimer, the term of this patent is extended or adjusted under 35 U.S.C. 154(b) by 208 days.

(21) Appl. No.: 12/730,096

(22) Filed: Mar. 23, 2010

(65) Prior Publication Data

US 2010/0243703 A1    Sep. 30, 2010

(30) Foreign Application Priority Data

Mar. 24, 2009   (DE) .................. 10 2009 001 790

(51) Int. Cl.
*B65D 85/24*   (2006.01)

(52) U.S. Cl. ........ 206/338; 206/347; 227/120; 227/136; 411/442; 411/443

(58) Field of Classification Search .............. 227/8, 136, 227/156, 10, 120; 411/442, 443; 206/338, 206/346, 347
See application file for complete search history.

(56) References Cited

U.S. PATENT DOCUMENTS

| | | | | |
|---|---|---|---|---|
| 4,930,673 A * | 6/1990 | Pfister | .......................... | 227/10 |
| 5,803,691 A * | 9/1998 | Huang | .......................... | 411/442 |
| 5,931,622 A * | 8/1999 | Gupta et al. | ................. | 411/443 |
| 5,984,096 A | 11/1999 | Shinjo | | |
| 7,516,841 B2 * | 4/2009 | Uejima et al. | ................. | 206/338 |
| 7,588,147 B2 * | 9/2009 | Del Hoyo | ..................... | 206/338 |
| 7,735,572 B2 * | 6/2010 | Gaudron | ......................... | 171/1 |
| 7,766,204 B2 * | 8/2010 | Spasov et al. | .................... | 227/8 |
| 2004/0042875 A1 | 3/2004 | Huang | | |
| 2004/0118719 A1 | 6/2004 | Powers et al. | | |
| 2004/0182728 A1 | 9/2004 | Almeras et al. | | |
| 2008/0121678 A1 | 5/2008 | Spasov et al. | | |

FOREIGN PATENT DOCUMENTS

| | | |
|---|---|---|
| DE | 1939801 C3 | 2/1970 |
| DE | 203 20 678 U1 | 1/2005 |
| EP | 0 336 089 A1 | 10/1989 |

OTHER PUBLICATIONS

German Search Report, dated Jul. 13, 2010, 3 pages.

* cited by examiner

*Primary Examiner* — Scott A. Smith
(74) *Attorney, Agent, or Firm* — Crowell & Moring LLP (57) ABSTRACT

A fastening element magazine strip is disclosed. The magazine strip having a carrier strip made of plastic extending along a longitudinal axis and formed over several carrier segments connected to one another. The carrier segments have at least one guide section with a guide diameter as well as feed-through openings, in which a respective fastening element is positionable. Projections project from the carrier strip to both sides of a plane defined by the carrier strip, and extend from their starting point on the carrier strip up to their free end over a length and feature a first width perpendicular to the length. The projections in the radial direction (as related to the longitudinal axis) project beyond the guide diameter. The projections are configured in at least one direction transverse to their longitudinal extension to be bendable.

19 Claims, 6 Drawing Sheets

FASTENING ELEMENT MAGAZINE STRIP

This application claims the priority of German Patent Document No. 10 2009 001 790.9, filed Mar. 24, 2009, the disclosure of which is expressly incorporated by reference herein.

BACKGROUND AND SUMMARY OF THE INVENTION

The present invention relates to a fastening element magazine strip. These types of fastening element magazine strips are used, for example, in hand-operated drive-in power tools or tackers, which are used to drive the fastening elements magazined in the fastening element magazine strip into a workpiece.

A fastening element magazine strip is known from U.S. 2008/0121678A1 in which fastening elements are arranged on a carrier strip, which is composed of several carrier segments connected to one another. Projections are arranged on each carrier segment of the carrier strip, which project perpendicular to a plane spanning from the carrier strip to both sides of the carrier strip. The projections in this case are larger in a first extension direction parallel to a longitudinal axis of the fastening elements than in a second extension direction running perpendicular to the longitudinal axis of the fastening elements. The projections make an additional function possible in which a counter slider of an adjusting device of a drive-in tool can engage on the projections so that the fastening element magazine strip can be displaced against the force of a transport spring element.

With this known fastening element magazine strip, special guide grooves must be provided for the projections to guide the carrier segments provided with projections in a bolt guide of a drive-in tool.

The object of the present invention is therefore to make available a fastening element magazine strip which makes an additional function possible and in which the cited disadvantages are avoided.

Accordingly, the projections are configured in at least one direction transverse to their longitudinal extension to be bendable, preferably elastically bendable, so that the projections in the region of the bolt guide of a drive-in power tool can be folded down or bent back during a drive-in process without hindering the drive-in process or strip transport. Separate guide grooves for the projections on the bolt guide are no longer necessary.

The projections are advantageously arranged on the carrier segments, wherein respectively at least one recess is provided on the outer circumference of the carrier segments into which the projections can be folded. When a carrier segment is sheared off the fastening element magazine strip during a drive-in process and guided though the bolt guide of a drive-in power tool, the projections can fold into the recess and do not hinder the movement of the carrier segment in the bolt guide.

Moreover, it is advantageous if the length of the projections corresponds to 2 to 8 times of their first width, thereby producing the elastic flexibility, in particular in the case of a carrier strip made of plastic, through the geometry of the projections.

Elastic articulations are configured advantageously on starting points of the projections on the carrier strip, and these articulations are responsible for an elastic flexibility and are technically easy to create (e.g., by tapering the material).

It is also favorable if the radial protrusion of the projections beyond the guide diameter corresponds to at least 0.15 to 0.7 times the guide diameter, thereby, on the one hand, rendering a secure guidance on the guide surface of the magazine possible and, on the other hand, and making an additional function possible, e.g., a radial outer contact surface for toothing of a transport rack of a magazine or a radial outer contact surface for a counter slider of the transport slider of a magazine.

Particularly when using a fastening element magazine strip in a magazine with rack transport, it is advantageous if the projections are arranged on each side of the carrier strip respectively in pairs.

Furthermore, the projections are advantageously configured isometrically in cross-section perpendicular to their longitudinal extension so that they are elastically bendable in at least two directions perpendicular or transverse to their longitudinal extension. The isometric arrangement of the cross-section does not have to extend in this case over the entire length of the projections, but can be limited, for example, to the articulation or a specific region.

The invention is depicted in several exemplary embodiments in the drawings.

DETAILED DESCRIPTION OF THE DRAWINGS

A fastening element magazine strip 10 according to the present invention is depicted in FIGS. 1 through 5, which spans a plane E in the extended (unbent) state. The fastening element magazine strip 10 has a carrier strip 11, which is constructed of several sleeve-like carrier segments 12 connected to one another in one piece. These carrier segments 12 are preferably fabricated of a plastic, such as, for example, polyethylene (PE), polypropylene (PP) or polystyrene (PS). Each of the carrier segments 12 features a receptacle configured as a feed-through opening 13 in which a respective fastening element 30 is positioned.

Figure 1:
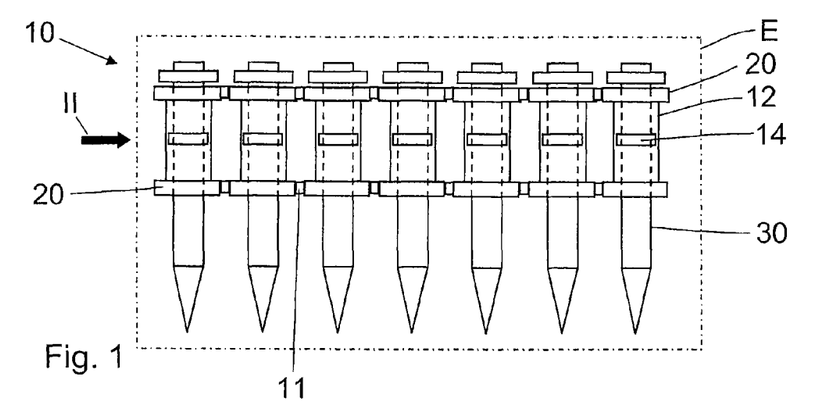
FIG. 1 is a side view of a fastening element magazine strip according to the present invention.
Figures 2, 3:
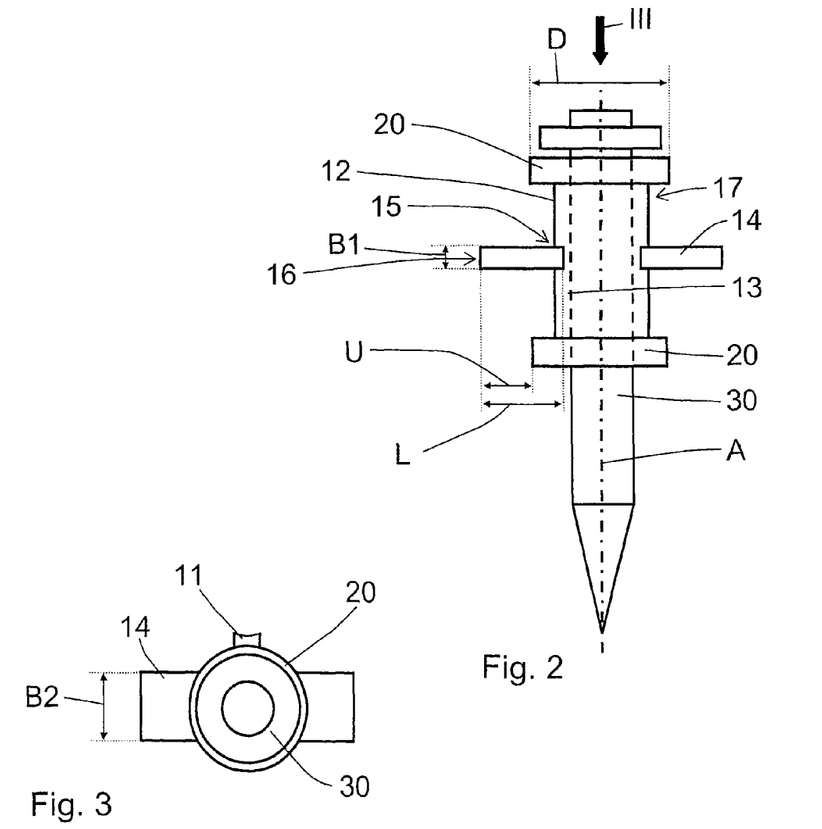
FIG. 2 is a carrier segment accommodating a fastening element in a view in the direction of arrow II from FIG. 1.
FIG. 3 is a carrier segment accommodating a fastening element in a view in the direction of arrow III from FIG. 2.

The carrier segments 12 run along a longitudinal axis A and have a guide section 20 with a guide diameter D on each of their two axial ends. A respective circumferential recess 17 is provided between the two guide sections 20 on the outer circumference of the carrier segments 12.

In the region of the recess 17, wing-like projections 14 project on both sides of plane E from the carrier strip 11 or the carrier segments 12. The projections 14 are arranged approximately in the center between the two guide sections 20 and extend in this case from their starting point 15 on the carrier segment 12 to their free end 16 over a length L. Moreover, the projections have a first width B1 perpendicular to the length L and parallel to plane E. The projections 14 project in the radial direction (as related to the longitudinal axis A) beyond the guide diameter D by a protrusion U, which preferably corresponds to 0.15 to 0.7 times the guide diameter D.

The projections 14 are configured to be elastically bendable in at least one direction transverse to their longitudinal extension with the length L, which is achieved in particular via their geometry. The length L of the projections 14 preferably corresponds to 2 to 8 times their first width B1. In the depicted example, the length L corresponds to approx. 4 times their first width B1. A second width B2, which runs in a direction perpendicular to the length L and perpendicular to the first width B1, is larger than the first width B1, but smaller than the length L.

Figure 4:
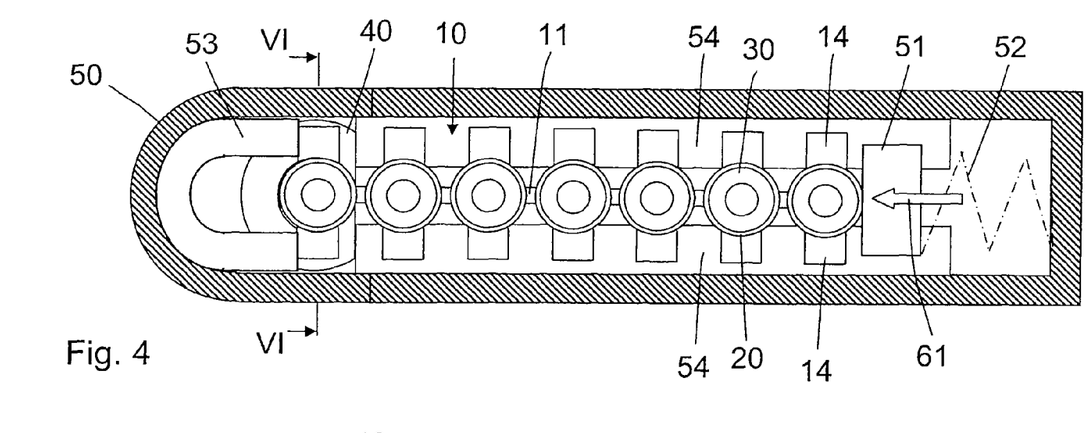
FIG. 4 is a magazine with a fastening element magazine strip according to FIGS. 1 through 3 situated therein in a first state.
Figure 5:
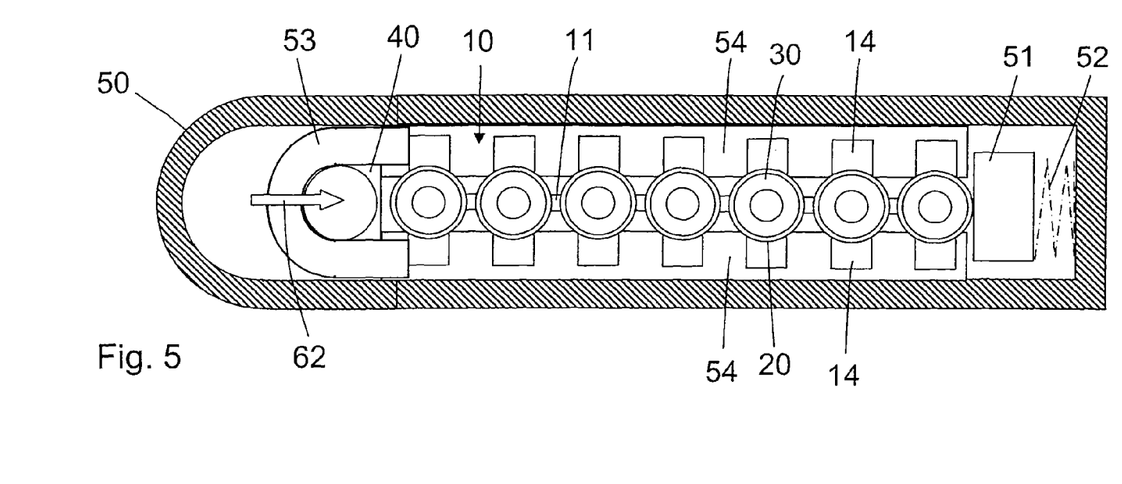
FIG. 5 is the magazine from FIG. 4 in a second state.

In FIGS. 4 and 5, the fastening element magazine strip 10 is arranged in a magazine 50 of a drive-in power tool, which can be used to drive fastening elements (such as, for example, nails or bolts) that are pre-assembled in the fastening element magazine strip 10 into a workpiece or component. FIGS. 4 and 5 depict only the drive-in power tool's bolt guide 40 as well as one portion of the drive piston 41. To transport the fastening element magazine strip 10 in the transport direction 61, a slider 51 acting in transport direction 61 via transport spring 52 is provided in the magazine 50. The fastening element magazine strip 10 is guided securely and in a non-canting manner via the wing-like projections 14 on the guide rails 54 of the magazine 50. In addition to the guidance function of the projections 14, they also serve as contact points for a counter slider 53. If the drive-in power tool is no longer in use, the fastening element magazine strip 10 can be displaced via the counter slider 53 that is moved in the opposite direction 62 of the transport direction 61 (e.g., when lifting the drive-in power tool off of the workpiece or component) in such a way that the uppermost fastening element 30 is moved out of the axial projection of the bolt guide 40 (see FIG. 5 in particular).

Figure 6:
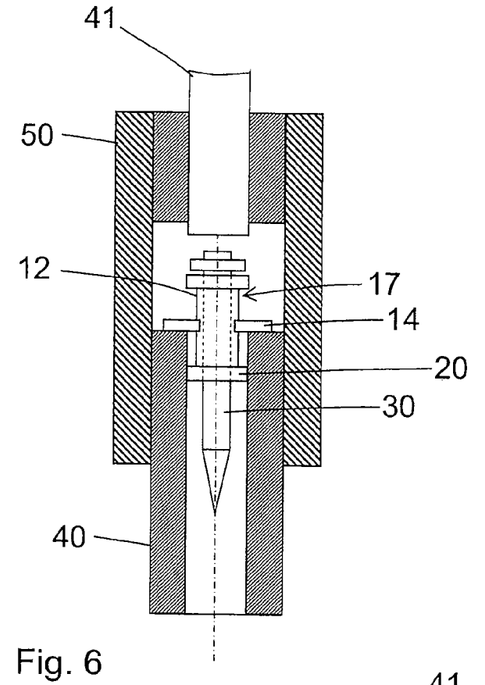
FIG. 6 is a section through the magazine along line VI-VI from FIG. 4.
Figure 7:
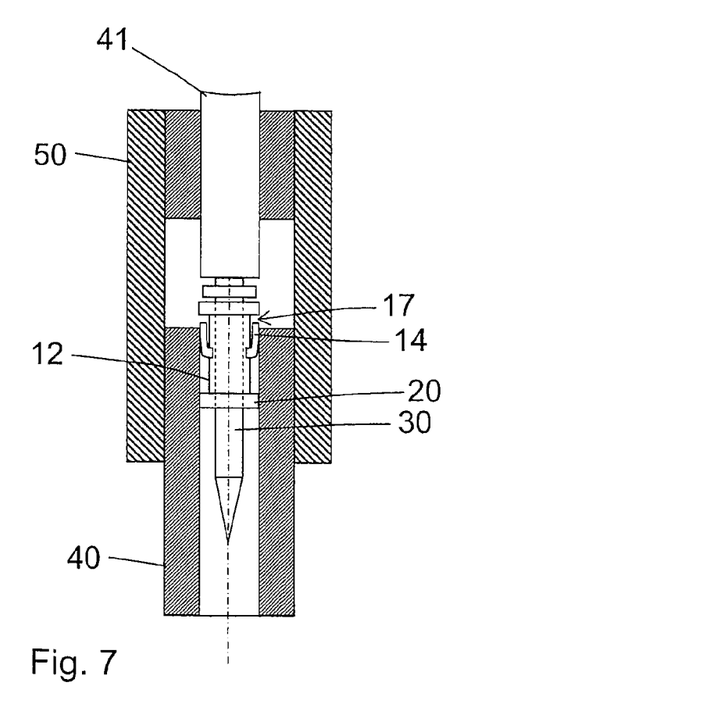
FIG. 7 is a section through the magazine analogous to FIG. 6, during a drive-in process.

FIGS. 6 and 7 depict the drive-in power tool's bolt guide 40 as well as a portion of the drive piston 41. In FIG. 6, a first fastening element 30 of the fastening element magazine strip 10 is situated in the drive-in-ready position in the bolt guide 40 or in its axial projection. In FIG. 7 the drive-in power tool was actuated so that the drive-in piston 41 is moved in the drive-in direction and thus shears off a fastening element 30 with the carrier segment 12 from the carrier strip 11. In the process the projections 14 can be folded completely into the recess 17 because of their elasticity. Thus, no bothersome leftovers from the projections 14 remain in the magazine 50 or in the space in front of the bolt guide 40.

Figure 8:
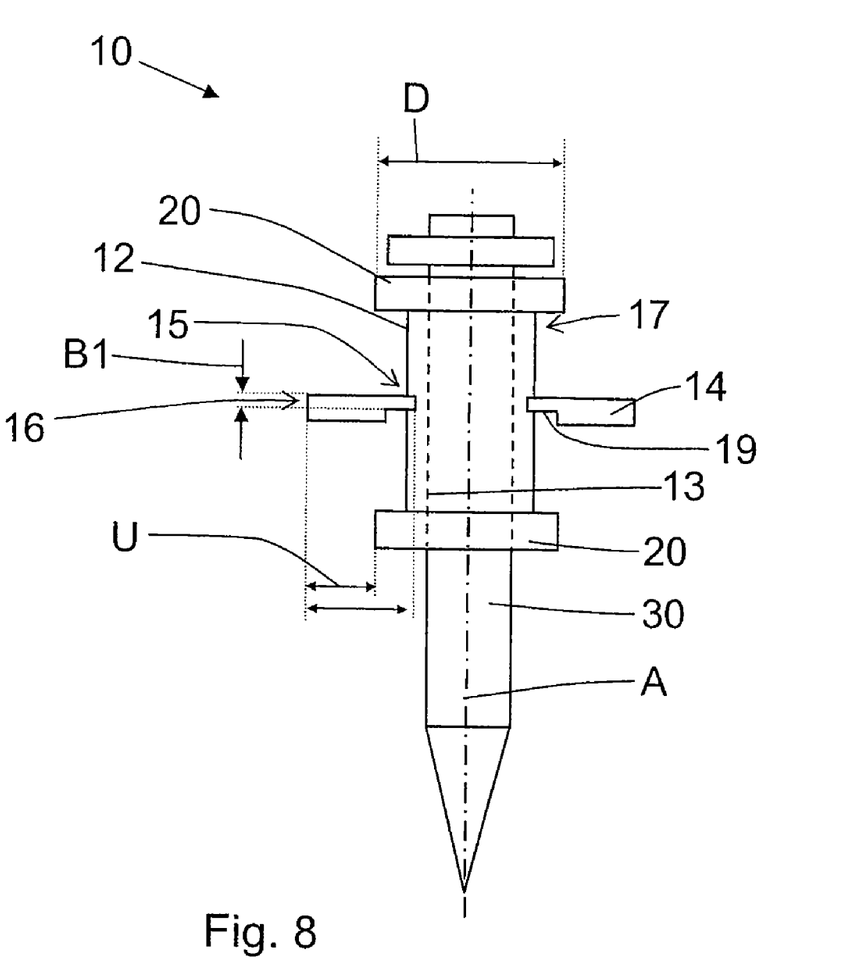
FIG. 8 is another fastening element magazine strip in a view analogous to FIG. 2.
Figure 9:
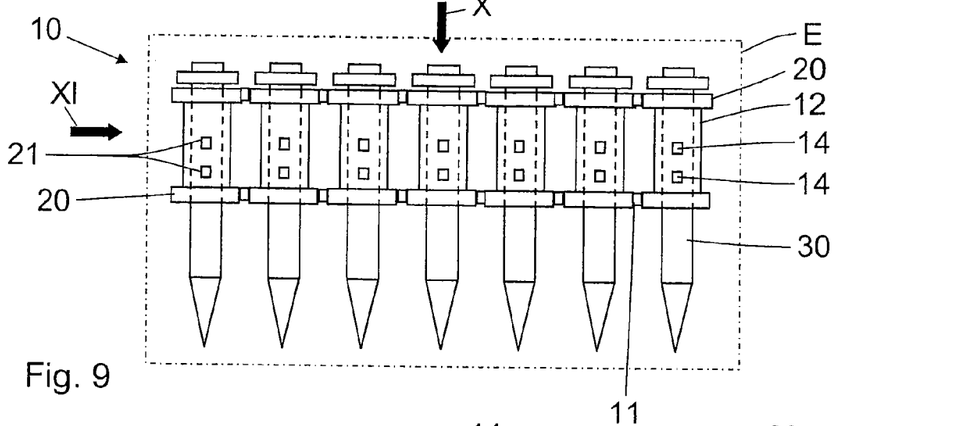
FIG. 9 is a side view of another fastening element magazine strip.
Figure 10:
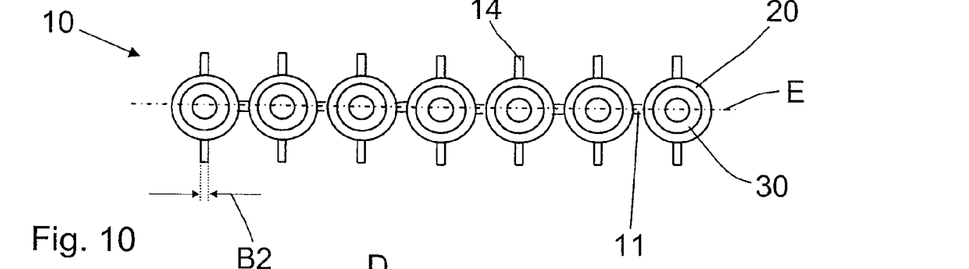
FIG. 10 is the fastening element magazine strip in a view in the direction of arrow X from FIG. 9.
Figure 11:
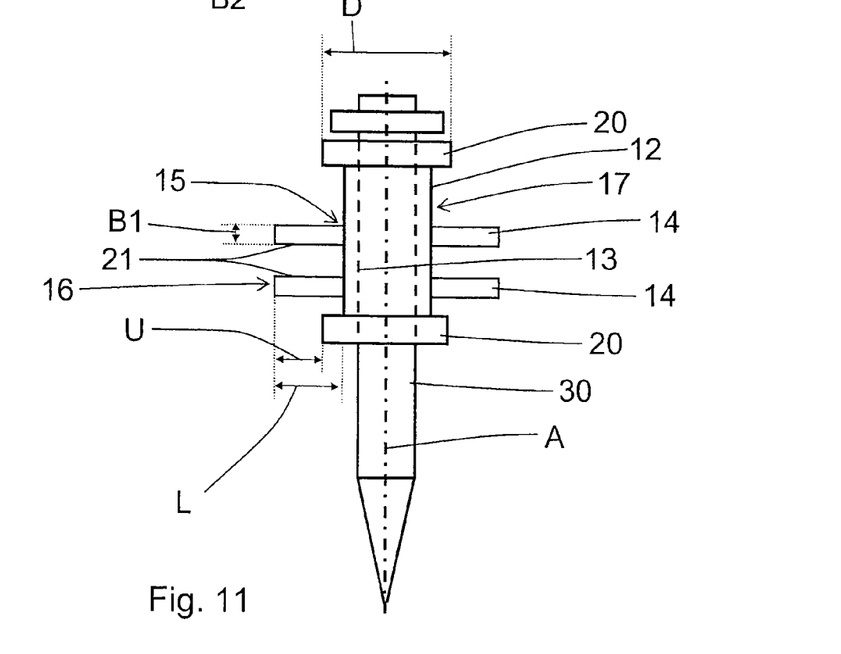
FIG. 11 is a carrier segment accommodating a fastening element in a view in the direction of arrow XI from FIG. 9.

The fastening element magazine strip 10 depicted in FIG. 8 differs from what was previously described only in that the projections 14 each have an articulation 19 in the form of an area of the projection 14 that is reduced in thickness in the region of the starting points 15. The length L corresponds preferably to 2 to 8 times the first width B1 in the region of the articulation 19.

In the depicted example, the length L corresponds to approx. 7.5 times of its first width B1. Due to the articulation 19, the elasticity or flexibility of the projections 14 is increased in the region of the starting point 15. With regard to the further embodiment of the fastening element magazine strip 10 and reference numbers that are not mentioned here, reference is made completely to the foregoing description of FIGS. 1 through 7.

FIGS. 9 through 14 show another fastening element magazine strip 10, which differs from the previous one in that here respective pairs 21 of projections 14 are arranged on the carrier segments 12 on both sides of the plane E. The projections 14 feature an isometric geometry in cross-section, i.e., the first width B1 is essentially equal to the second width B2. The length L of the projections 14 corresponds preferably to 2 to 8 times of its width B1. In the depicted example, the length L corresponds to approx. 4.3 times their first width B1. Respectively one of the projections 14 of a pair 21 is arranged approximately in the center between the two guide sections 20, while the second projection 14 of a pair 21 is closer to a guide section 20 that lies the in the drive-in direction. The projections 14 extend in-turn from their starting point 15 on carrier segment 12 to their free end 16 over a length L.

Figures 12, 13:
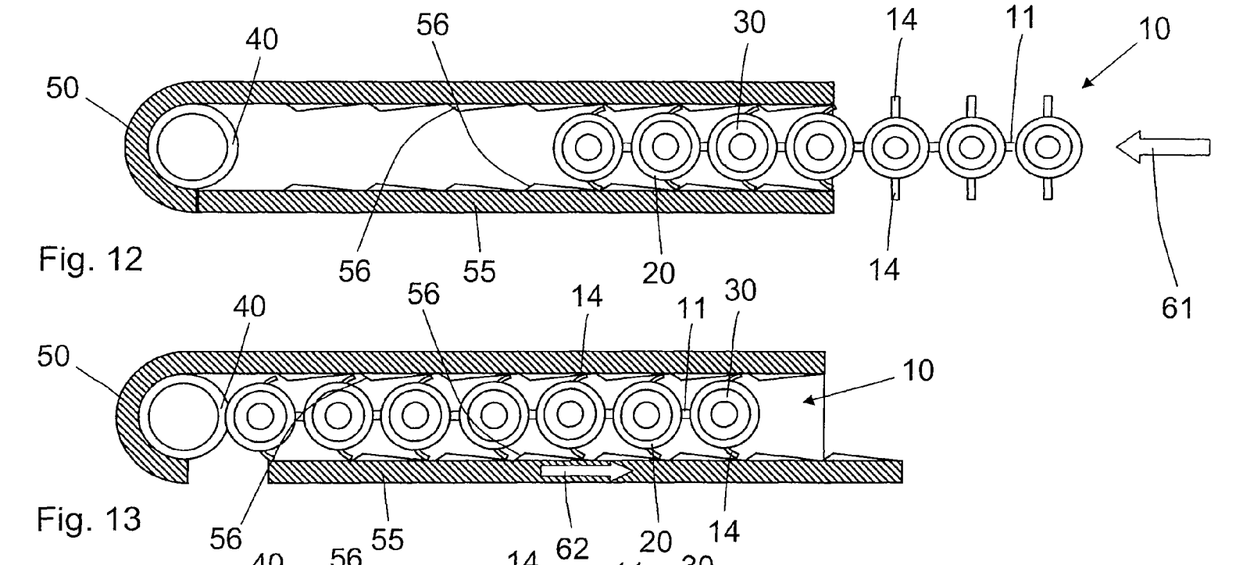
FIG. 12 is a magazine during the insertion of a fastening element magazine strip according to FIGS. 9 through 11 into the magazine.
FIG. 13 is the magazine from FIG. 12 during a first movement of a transport rack.

FIG. 12 shows how the fastening element magazine strip 10 is inserted into a magazine 50 in transport direction 61. A respective toothing 56 is arranged inside on the two interior walls of the magazine 50, which cooperates with the projections 14 to transport the fastening element magazine strip 10. A wall section of the magazine 50 is configured as the transport rack 55, which is displaceable both in the transport direction 61 as well in precisely the opposite direction 62.

In FIG. 13, the fastening element magazine strip 10 is situated directly beneath the bolt guide 40 or its axial projection. The transport rack 55 is moved in a first transport movement in the opposite direction 62, wherein the toothing 56 of the transport rack 55 can be moved past this due to the elasticity of the projections 14 without also moving the fastening element magazine strip 10 along with it. The transport rack 55 itself does not have to be positioned elastically in the direction perpendicular to the transport direction.

Figure 14:
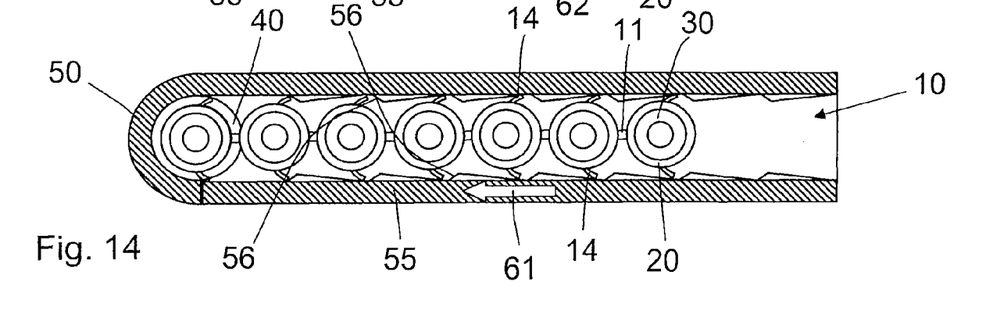
FIG. 14 is the magazine from FIG. 12 during a transport movement of the transport rack.

With a movement of the transport rack 55 in transport direction 61, the fastening element magazine strip 10 is also moved along in transport direction 61 and a first fastening element 30 is transported into the bolt guide 40 or into the height of its axial projection.

During a drive-in process, the projections 14 can be folded completely into the recess 17 due to their elasticity. Thus, no bothersome leftovers from the projections 14 remain in the magazine 50 or in the space in front of the bolt guide 40.

With regard to the reference numbers that are not mentioned here, reference is made completely to the foregoing description of FIGS. 1 through 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening element magazine strip, comprising:
   a carrier strip made of plastic;
   a plurality of carrier segments connected to one another, wherein the carrier strip is formed over the plurality of carrier segments, and wherein each of the plurality of carrier segments runs along a respective longitudinal axis;

wherein each of the plurality of carrier segments include a guide section with a guide diameter and a feed-through opening in which a respective fastening element is positionable;

wherein projections project from the carrier segments to at least one side of a plane defined by the carrier segments and extend from a starting point on the carrier segments up to a free end over a length and include a first width perpendicular to the length;

wherein the projections, in a radial direction as related to the longitudinal axis, project beyond the guide diameter;

wherein the projections are bendable in at least one direction transverse to a longitudinal extension of the projections; and wherein the guide section is disposed at a first location on the carrier segment on the longitudinal axis, wherein the projections are disposed at a second location on the carrier segments on the longitudinal axis, and wherein the first location is not coextensive with the second location.

2. The fastening element magazine strip according to claim 1, wherein the length of the projections corresponds to 2 to 8 times the first width.

3. The fastening element magazine strip according to claim 1, wherein elastic articulations are configured on the starting point of the projections.

4. The fastening element magazine strip according to claim 1, wherein the radial projection of the projections beyond the guide diameter corresponds to at least 0.15 to 0.7 times the guide diameter.

5. The fastening element magazine strip according to claim 1, wherein the projections are arranged in a pair on the at least one side of the plane defined by the carrier segments.

6. The fastening element magazine strip according to claim 1, wherein the projections are configured isometrically in cross-section perpendicular to the longitudinal extension of the projections.

7. The fastening element magazine strip according to claim 1, wherein each of the plurality of carrier segments includes a second guide section, wherein the guide section and the second guide section are disposed at respective axial ends of the carrier segments, and wherein a recess is disposed between the guide section and the second guide section.

8. The fastening element magazine strip according to claim 7, wherein the projections project from a region of the recess.

9. The fastening element magazine strip according to claim 1, wherein recesses are provided on an outer circumference of the carrier segments and wherein the projections are foldable into a respective recess.

10. A fastening element magazine strip, comprising:
a carrier strip made of plastic;
a plurality of carrier segments connected to one another, wherein the carrier strip is formed over the plurality of carrier segments, and wherein each of the plurality of carrier segments runs along a respective longitudinal axis;
wherein each of the plurality of carrier segments include a guide section with a guide diameter and a feed-through opening in which a respective fastening element is positionable;
wherein projections project from the carrier segments to at least one side of a plane defined by the carrier segments and extend from a starting point on the carrier segments up to a free end over a length and include a first width perpendicular to the length;
wherein the projections, in a radial direction as related to the longitudinal axis, project beyond the guide diameter;
wherein the projections are bendable in at least one direction transverse to a longitudinal extension of the projections;
and wherein recesses are provided on an outer circumference of the carrier segments and wherein the projections are foldable into a respective recess.

11. The fastening element magazine strip according to claim 10, wherein the length of the projections corresponds to 2 to 8 times the first width.

12. The fastening element magazine strip according to claim 10, wherein elastic articulations are configured on the starting point of the projections.

13. The fastening element magazine strip according to claim 10, wherein the radial projection of the projections beyond the guide diameter corresponds to at least 0.15 to 0.7 times the guide diameter.

14. The fastening element magazine strip according to claim 10, wherein the projections are arranged in a pair on the at least one side of the plane defined by the carrier segments.

15. The fastening element magazine strip according to claim 10, wherein the projections are configured isometrically in cross-section perpendicular to the longitudinal extension of the projections.

16. The fastening element magazine strip according to claim 10, wherein each of the plurality of carrier segments includes a second guide section, wherein the guide section and the second guide section are disposed at respective axial ends of the carrier segments, and wherein the respective recess is disposed between the guide section and the second guide section.

17. The fastening element magazine strip according to claim 16, wherein the projections project from a region of the respective recess.

18. A fastening element magazine strip, comprising:
a carrier strip made of plastic;
a plurality of carrier segments connected to one another, wherein the carrier strip is formed over the plurality of carrier segments, and wherein each of the plurality of carrier segments runs along a respective longitudinal axis;
wherein each of the plurality of carrier segments includes:
a guide section with a guide diameter and a feed-through opening in which a respective fastening element is positionable; and
a projection extending from a starting point on the carrier segment up to a free end over a length and including a first width perpendicular to the length;
wherein the projection, in a radial direction as related to the longitudinal axis, projects beyond the guide diameter;
wherein the projection is bendable in at least one direction transverse to a longitudinal extension of the projection;
and wherein the guide section is disposed at a first location on the carrier segment on the longitudinal axis, wherein the projection is disposed at a second location on the carrier segment on the longitudinal axis, and wherein the first location is not coextensive with the second location.

19. A fastening element magazine strip, comprising:
a carrier strip made of plastic;
a plurality of carrier segments connected to one another, wherein the carrier strip is formed over the plurality of carrier segments, and wherein each of the plurality of carrier segments runs along a respective longitudinal axis;

wherein each of the plurality of carrier segments includes:
- a guide section with a guide diameter and a feed-through opening in which a respective fastening element is positionable;
- a projection extending from a starting point on the carrier segment up to a free end over a length and including a first width perpendicular to the length;
- wherein the projection, in a radial direction as related to the longitudinal axis, projects beyond the guide diameter;
- wherein the projection is bendable in at least one direction transverse to a longitudinal extension of the projection; and
- a recess on an outer circumference of the carrier segment, wherein the projection is foldable into the recess.

* * * * *